(12) United States Patent
Bovero et al.

(10) Patent No.: US 10,877,192 B2
(45) Date of Patent: Dec. 29, 2020

(54) METHOD OF FABRICATING SMART PHOTONIC STRUCTURES FOR MATERIAL MONITORING

(71) Applicant: Saudi Arabian Oil Company, Dhahran (SA)

(72) Inventors: Enrico Bovero, Dhahran (SA); Aziz Fihri, Dhahran (SA); Abdullah A. Al-Shahrani, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 205 days.

(21) Appl. No.: 15/490,566

(22) Filed: Apr. 18, 2017

(65) Prior Publication Data

US 2018/0299597 A1    Oct. 18, 2018

(51) Int. Cl.

| | | |
|---|---|---|
| *B29D 11/00* | (2006.01) | |
| *G02B 5/18* | (2006.01) | |
| *G02B 1/14* | (2015.01) | |
| *B29C 33/60* | (2006.01) | |
| *G01B 11/16* | (2006.01) | |
| *B29K 105/00* | (2006.01) | |

(52) U.S. Cl.
CPC ............ *G02B 5/1852* (2013.01); *B29C 33/60* (2013.01); *B29D 11/00769* (2013.01); *G01B 11/165* (2013.01); *G02B 1/14* (2015.01); *B29K 2105/0094* (2013.01); *B29K 2883/00* (2013.01)

(58) Field of Classification Search
CPC ...... G02B 5/1852; G02B 1/14; G01B 11/165; B29D 11/00769; B29C 33/60
See application file for complete search history.

(56) References Cited

U.S. PATENT DOCUMENTS

| | | | |
|---|---|---|---|
| 4,986,671 | A | 1/1991 | Sun |
| 5,446,286 | A | 8/1995 | Bhargava |
| 5,568,259 | A | 10/1996 | Kamegawa |
| 5,682,237 | A | 10/1997 | Belk |
| 5,861,129 | A | 1/1999 | Katoot |
| 5,881,200 | A | 3/1999 | Burt |
| 6,091,872 | A | 7/2000 | Katoot |
| 6,460,417 | B1 | 10/2002 | Potyrailo |

(Continued)

FOREIGN PATENT DOCUMENTS

| | | |
|---|---|---|
| CA | 2712880 A1 | 2/2012 |
| CN | 35100054 A | 8/1986 |

(Continued)

OTHER PUBLICATIONS

Chen, J. et al, "Soft Mold-Based Hot Embossing Process for Precision Imprinting of Optical Components on Non-Planar Surfaces" in Optics Express, vol. 23, No. 16, p. 1-9 (2015).

(Continued)

*Primary Examiner* — Matthieu D Vargot
(74) *Attorney, Agent, or Firm* — Leason Ellis LLP (57) ABSTRACT

A method of fabricating a photonic structure on a surface of a solid substrate including a first material comprises depositing a deformable layer of the first material onto the surface of the solid substrate, embossing the deformable layer with a mold bear a photonic structure pattern and solidifying the deformable layer to be integral with the surface of the solid substrate with the mold in place to form permanent photonic structures in the solidified layer.

17 Claims, 6 Drawing Sheets

(56) References Cited

U.S. PATENT DOCUMENTS

| | | |
|---|---|---|
| 6,499,355 B1 | 12/2002 | Potyrailo |
| 6,833,274 B2 | 12/2004 | Lawrence |
| 6,854,327 B2 | 2/2005 | Rambow |
| 7,054,513 B2 | 5/2006 | Herz |
| 7,095,502 B2 | 8/2006 | Lakowicz |
| 7,138,621 B2 | 11/2006 | Wang |
| 7,308,163 B2 | 12/2007 | Bratkovski |
| 7,489,402 B2 | 2/2009 | Selker |
| 7,646,945 B2 | 1/2010 | Jones |
| 7,660,496 B2 | 2/2010 | Roberts |
| 7,780,912 B2 | 8/2010 | Farmer |
| 7,957,617 B2 | 6/2011 | Vollmer |
| 7,961,315 B2 | 6/2011 | Cunningham |
| 8,135,244 B1 | 3/2012 | Sander |
| 8,153,066 B2 | 4/2012 | Weisbuch |
| 8,219,180 B2 | 7/2012 | Gao |
| 8,344,333 B2 | 1/2013 | Lu |
| 8,384,892 B2 | 2/2013 | Cunningham |
| 8,409,524 B2 | 4/2013 | Farmer |
| 8,576,385 B2 | 11/2013 | Roberts |
| 8,725,234 B2 | 5/2014 | Gao |
| 8,852,512 B2 | 10/2014 | Lam |
| 8,854,624 B2 | 10/2014 | Pervez |
| 9,086,331 B2 | 7/2015 | Carralero |
| 9,170,172 B2 | 10/2015 | Hunt |
| 9,316,903 B2 | 4/2016 | Chen |
| 2004/0150827 A1 | 8/2004 | Potyrailo |
| 2005/0205574 A1* | 9/2005 | Lambotte ........... C11D 17/0039 220/234 |
| 2006/0228635 A1 | 10/2006 | Suleski |
| 2006/0291779 A1* | 12/2006 | Schulz .............. G01N 21/0303 385/37 |
| 2007/0059497 A1* | 3/2007 | Huang ................. B82Y 10/00 428/195.1 |
| 2007/0243332 A1* | 10/2007 | Zang .................... C08L 51/006 427/393.5 |
| 2008/0144001 A1 | 6/2008 | Heeg |
| 2009/0224416 A1 | 9/2009 | Laakkonen et al. |
| 2011/0096932 A1 | 4/2011 | Schuijers |
| 2012/0039357 A1 | 2/2012 | Levesque |
| 2012/0126458 A1 | 5/2012 | King et al. |
| 2014/0323323 A1 | 10/2014 | Cunningham |
| 2015/0268237 A1 | 9/2015 | Kerimo |
| 2016/0282526 A1 | 9/2016 | Aono et al. |

FOREIGN PATENT DOCUMENTS

| | | |
|---|---|---|
| CN | 1743795 A | 3/2006 |
| CN | 1831486 A | 9/2006 |
| CN | 1844856 A | 10/2006 |
| CN | 102230834 A | 11/2011 |
| CN | 103808441 A | 5/2014 |
| CN | 103811998 A | 5/2014 |
| CN | 103812002 A | 5/2014 |
| CN | 203857939 U | 10/2014 |
| CN | 204115925 U | 1/2015 |
| DE | 102014203254 A1 | 8/2015 |
| EP | 0455823 A1 | 11/1991 |
| EP | 1296117 A1 | 3/2003 |
| EP | 2469252 A1 | 6/2012 |
| GB | 2421075 A | 6/2006 |
| JP | 2007139698 A | 6/2007 |
| JP | 2016164961 A | 9/2016 |
| WO | 9617266 A1 | 6/1996 |
| WO | 2008014519 A2 | 1/2008 |
| WO | 2008060415 A1 | 5/2008 |
| WO | 2012098241 A3 | 7/2012 |
| WO | 2012123436 A1 | 9/2012 |
| WO | 2014063843 A1 | 5/2014 |
| WO | 2014111230 A1 | 7/2014 |

OTHER PUBLICATIONS

Examination Report in Corresponding Gulf Cost Application No. 2018-35140 dated May 30, 2020. 4 pages.
Written Opinion in Corresponding Singapore Application No. 11201909373R dated Sep. 18, 2020. 5 pages.

* cited by examiner

METHOD OF FABRICATING SMART PHOTONIC STRUCTURES FOR MATERIAL MONITORING

FIELD OF THE INVENTION

The present invention relates to surface patterning and in particular relates to a method of fabricating smart photonic structures for material monitoring.

BACKGROUND OF THE INVENTION

Many industrial concerns employ infrastructural equipment such as tanks and pipelines which are subject to corrosion and wear over time. It is often either difficult or overly burdensome to monitor such equipment for damage or deformation by conventional methods. To enable convenient monitoring, "smart" materials can be integrated into the structures to be monitored. Smart materials include photonic elements, such as diffraction gratings, that indicate the presence of stresses, deformation and/or defects through changes in the manner in which they respond to electromagnetic radiation. It has been found that embedding or affixing smart photonic materials to structures in the field is a non-destructive, reliable and accurate method of monitoring the health of the structures.

One problem with conventional techniques of integrating smart materials is that the monitored structures are often large in size and extended over large distances. Equipping such structures with sufficient smart material is therefore a challenge because methods for fabricating original photonic structures on a large scale are generally costly and limited to certain types of materials, with limited dimensions, shapes and/or profiles. There are two main current techniques for fabricating two-dimensional photonic materials, a holographic technique, and a ruled technique. Both techniques suffer limitations in the ability to scale fabrication to large areal dimensions in a cost-efficient manner. In addition holographic and ruled techniques are generally suited to structuring flat surfaces on materials such as glass, silica and silicon, and are not easily adapted to structuring curved and complex surfaces.

As such, there is a need for improved and cost-effective techniques for fabricating and integrating smart materials into structures, particularly structures that have a large surface area. The present invention addresses one or more of these needs.

SUMMARY OF THE INVENTION

According to an aspect of the present invention, a method of fabricating a photonic structure on the surface of a solid substrate is provided. The method comprises depositing a deformable layer of the same composition as the substrate onto the substrate surface, embossing the deformable layer with a mold bearing a photonic structure pattern, and then solidifying the deformable layer to be integral with the surface of the solid substrate with the mold in place to form permanent photonic structures in the solidified layer.

According to other aspects of the present invention, the photonic structures include periodic features arranged along at least one dimension. In some implementations the periodic features form a diffraction grating. In some implementations the periodic features are arranged in two dimensions.

According to other aspects of the present invention, in some embodiments the substrate surface and deformable layer comprise a polymer resin. In some implementations, the polymer resin is an epoxy or an epoxy composite, a polymethylmethacrylate, or a cyanoacrylate cement, as a non-limiting list of possible materials for the deformable layer. In some implementations, the deformable layer is deposited in a fluid, semi-viscous or viscous form over the surface of the substrate. In particular implementations, the deformable layer has a viscosity ranging from 100 to 5000 cP.

According to other aspects of the present invention, in some embodiments the deformable layer can be created by partially dissolving or melting the already existing material. This partial dissolution temporarily reduces the viscosity in proximity of the surface of the materials, so that it can be shaped with the mold bearing the photonic structure pattern.

According to other aspects of the present invention, the deformable layer is solidified by at least one of crystallization, thermosetting, thermoplastic, polymerization, solvent evaporation, vitrification, magnetorheological transitions and condensation. In some implementations, the material of the deformable layer forms cross-links with the surface of the substrate during solidification.

According to yet other aspects of the present invention, in certain embodiments, the mold is composed of polydimethylsiloxane According to yet other aspects of the present invention, the method of fabrication further includes adding an anti-adhesion layer to the mold prior to embossing in order to prevent adhesion between the mold and the solidified layer of deformable material. In some implementations the anti-adhesion layer comprises a mono- or multilayer. In still other aspects, the method further includes adding a layer to the mold prior to embossing in order to modify properties of the deformable layer upon solidification. In some implementations, the added layer comprises a protective coating. In some implementations, the added layer modifies optical properties of the photonic structure.

According to yet other aspects of the present invention, the method of fabrication further includes adding a layer to the deformable layer prior to embossing to modify properties of the deformable layer upon solidification. In some implementations, the added layer comprises a protective coating. In some implementations, the added layer modifies optical properties of the photonic structure.

According to yet another aspect, a method of fabricating a photonic structure on a surface of a solid substrate is provided. The method comprises depositing a deformable layer onto the surface of the solid substrate, embossing the deformable layer with a mold bearing a photonic structure pattern and solidifying the deformable layer to be integral with the surface of the solid substrate with the mold in place to form permanent photonic structures in the solidified layer, wherein the deformable layer forms cross-linking bonds with the substrate during solidification so as to firmly embed the solidified layer in the substrate. In one implementation, the deformable layer is comprised of the same material as that of the solid substrate.

These and other aspects, features, and advantages can be appreciated from the following description of certain embodiments of the invention and the accompanying drawing figures and claims.

DETAILED DESCRIPTION CERTAIN OF EMBODIMENTS OF THE INVENTION

By way of overview, methods of fabricating photonic structures are disclosed herein which are suitable, among other purposes, for the purpose of structural health monitoring. According to a first aspect, a method of fabricating includes depositing a deformable layer of material that is fluid, or of low to medium viscosity, onto the surface of a structure to be monitored (the structure is referred to hereinafter as the "substrate"). The deposited layer is then embossed with a mold that includes a surface pattern taken from an original template. The surface pattern of the template corresponds to a photonic structure. When embossed, the deposited layer obtains a pattern which is the reverse of the surface pattern on the mold, which in turn, is identical with the photonic structure pattern taken from the template. The photonic structures can comprise a diffraction grating, and/or other structures that interact with electromagnetic radiation. After embossment, the fluid or semi-fluid deposited layer, which now includes the photonic structure, is then solidified in situ over the substrate. Upon solidification, the deposited layer and photonic structure are fixedly embedded within the substrate.

In one or more embodiments, a method of fabricating a photonic structure on the surface of a solid substrate is provided. The method comprises depositing a deformable layer of the same or similar composition as the substrate, or a different material presenting strong adhesion to the substrate onto the substrate surface, embossing the deformable layer with a mold bearing a photonic structure pattern, and then solidifying the deformable layer to be integral with the surface of the solid substrate with the mold in place to form permanent photonic structures in the solidified layer.

In some embodiments, the deformable layer and the substrate have the same composition, in which both are composed of a material, such as epoxy, in which known, strong bonding reactions (e.g., polymerization, crystallization) occur between a heated or otherwise viscous portion solidifies onto an already-solid portion. In this case, the deformable layer and substrate become indistinguishable upon solidification of the deformable layer. In other embodiments, the deformable layer and the substrate have a similar composition in that they share a component that promotes binding and therefore adhesion. For example, in some implementations the deformable layer is an epoxy and the substrate is an epoxy composite, i.e., an epoxy mixed with other materials. In such implementations, polymeric epoxy chains in the deformable layer bond to the polymeric chains of epoxy in the substrate, even in the presence of other compounds and materials. In other embodiments, the deformable layer and the substrate have different compositions, such as an epoxy and glass, but the materials nevertheless still provide bonding reactions, by virtue of their chemical properties, to support adherence between the solidified layer and the substrate. The methods disclosed herein can be used to fabricate smart structures on a variety of different types of materials and on a variety of different structures sizes and shapes.

FIGS. 1A-2F, taken together, illustrate an embodiment of a method for fabricating photonic structures according to the principles disclosed herein. In other embodiments of the method, a subset of the steps depicted in FIGS. 1A-2F can be performed. In addition, in other embodiments the steps can be performed in a different order, and additional steps can be performed.

Figure 1A:
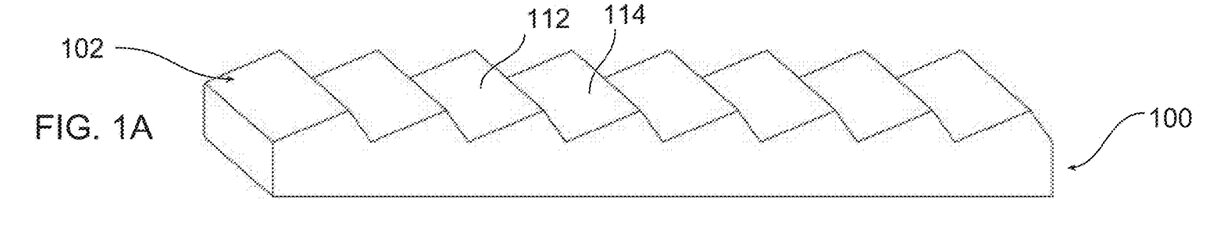
FIG. 1A is a perspective view of an example template including a pattern for forming a photonic structure, a starting point for a method of fabricating photonic structures according to an exemplary embodiment of the present application.

Turning now to FIG. 1A, a template 100 includes a surface 102 that includes and stores a pattern for fabricating photonic and/or other structures. The surface 102 (top or bottom) of template 100 is patterned to include periodic features, e.g., 112, 114, spaced from one another by approximately the same distance. In the example shown, the periodic features 112, 114 are saw-tooth or ramp features which comprise a known pattern for forming a diffraction grating. However, other patterns can be employed to elicit different optical properties. In some implementations, the distance between the features 112, 114 is on the order of the magnitude of expected deformations of the monitored structure, for example, in the range of 100 μm to 100 nanometers, although there is no limitation on the sizes of the features other than practical limits. Additionally while in the embodiment shown in FIG. 1A the features 112, 114 are depicted as being periodic in one dimension, in alternative embodiments the template 100 includes features (the same or additional features) that are periodic in two dimensions along the surface 102. Since it is intended for the template 100 to be reusable, it is preferable to fabricate the original on a durable, solid material which will maintain the pattern over time without deformation. There is no limitation on the manner in which the template 100 is fabricated and common lithographic processes such as photolithography and/or other patterning techniques can be employed to obtain a high-level of precision for the patterned features of the template.

Figure 1B:
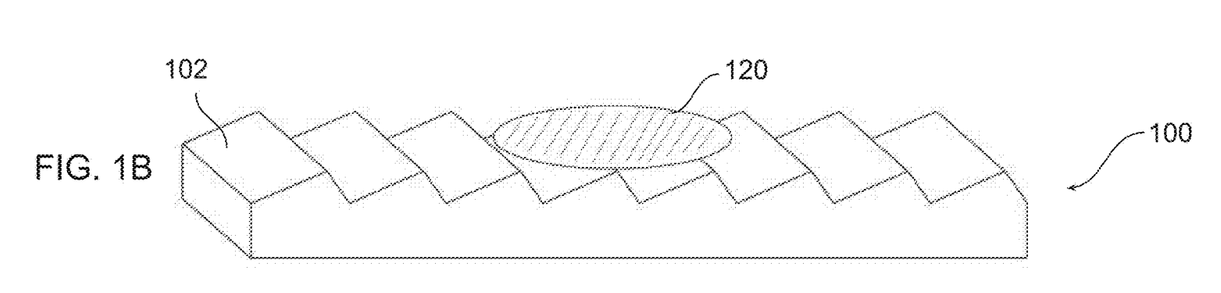
FIG. 1B is a perspective view illustrating a subsequent step of an exemplary embodiment of a method of fabrication according to the present invention in which a molding compound is deposited on the pattern-bearing surface of the template.
Figure 1C:
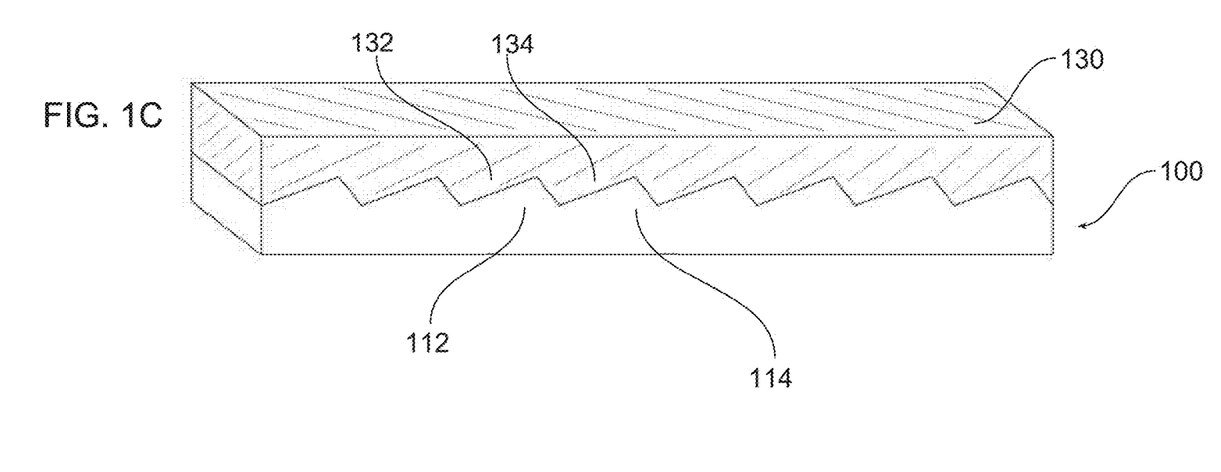
FIG. 1C is a perspective view illustrating a subsequent step of an exemplary embodiment of a method of fabrication according to the present invention in which the molding compound is cured to form a firm pattern-bearing mold.

FIG. 1B shows a following procedural step, in which a molding compound 120 is deposited on the patterned surface 102 of the template 100. In some embodiments, the molding compound 120 is composed of an elastomeric material that has both elasticity and viscosity. Exemplary elastomeric materials that are suitable include, but are not limited to, silicone rubbers such as PDMS (Polydimethylsiloxane), which at long flow times (or high temperatures) behave as a viscous liquid, and at short flow times (or low temperatures) behave as an elastic solid. In some implementations, the viscosity range of the molding compound as it is deposited can be between 1 and 100,000 cP. As the molding compound 120 is applied it gradually conforms to the profile of the template 100. In other embodiments, the molding compound 120 can comprise a material suitable for hot embossing, such as a liquid metal. The molding compound 120 is deposited over the entire surface 102 up to a desired thickness, to cover the periodic features 112, 114.

After completion of deposition, the molding compound 120 is solidified, using known techniques that depend on the material used (e.g., photo or heat curing, cooling), to form a firm and flexible mold 130 that can be manipulated and used repeatedly. In terms of elasticity, the solidified mold 130 preferably has a Young's modulus between 200-1000 KPa. The solidified mold 130, shown in FIG. 1C, includes a surface having reverse features 132, 134 which correspond to features 112, 114 of the template 100. More specifically, where the features of the template 112, 114 protrude, the corresponding reverse features 132, 134 of the mold 130 are recessed, and vice versa.

Figure 1D:
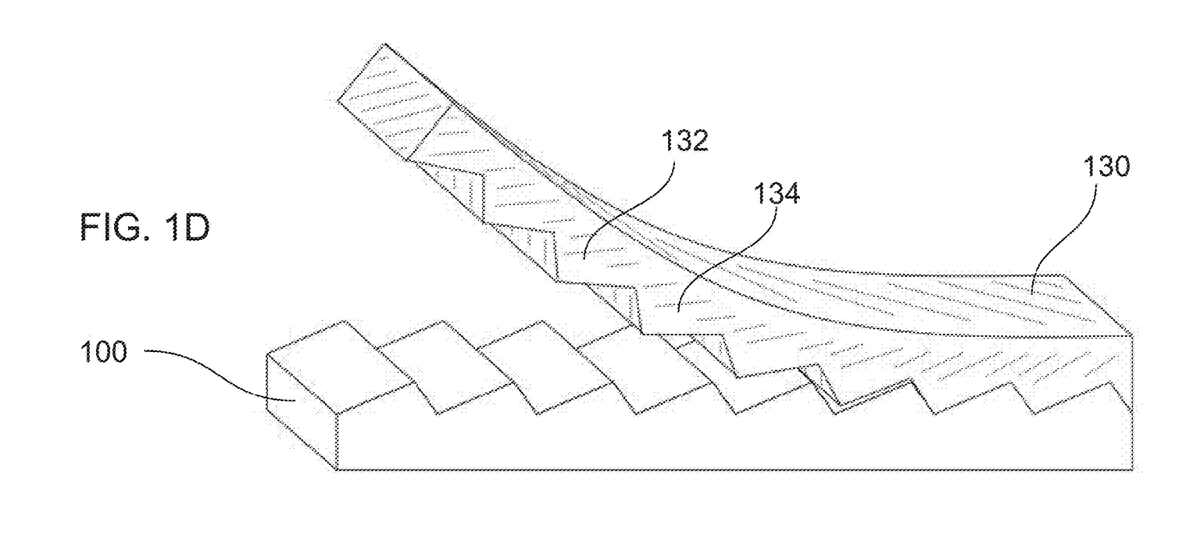
FIG. 1D is a perspective view illustrating a subsequent step of an exemplary embodiment of a method of fabrication according to the present invention in which the pattern-bearing mold is removed from the template.
Figure 1E:
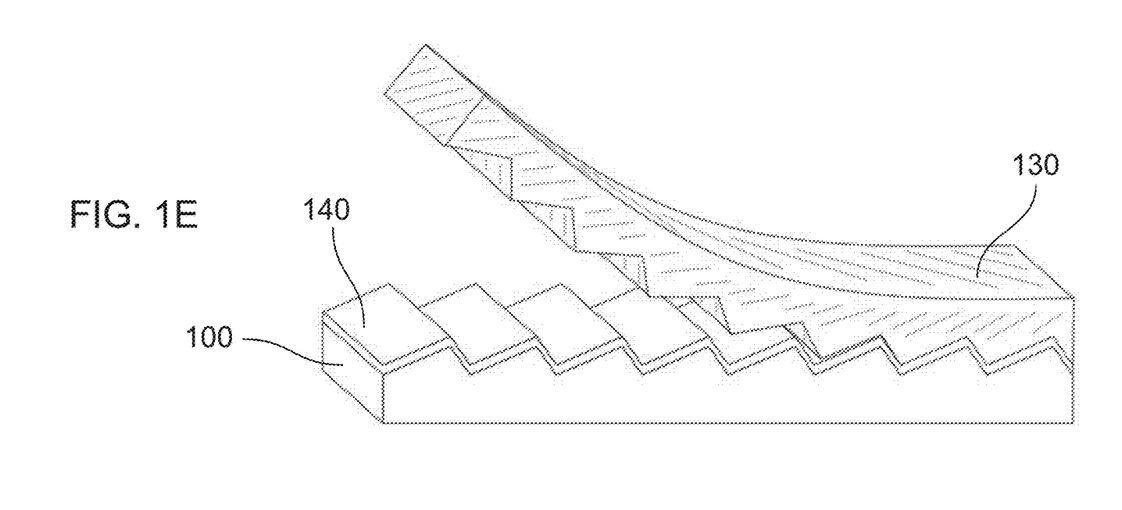
FIG. 1E is a perspective view illustrating an exemplary embodiment of a method of fabrication according to the present invention in which an anti-adhesion layer is added between the mold and the template.

In a following step, shown in FIG. 1D, the mold 130 is removed from the template 100, for example, by peeling. It is preferable that the mold 130 be removed as 'cleanly' as possible, without either altering the surface features, e.g., 132, 134 and/or leaving any residue of mold material on the template. Some mold materials upon solidification (or otherwise) are non-adhering with respect to particular template materials. When naturally non-adhering materials are used, it is be relatively easy to remove the mold from the template without damaging or altering the mold. However, removal can be facilitated in some implementations by adding an additional layer 140 such as a liquid or monolayer, such as trichloro (1H,1H,2H,2H-perfluorooctyl) silane, onto template 100 to be situated between the molding compound and template as shown in FIG. 1E. Additional layer 140 can be applied in a thin film so as to not alter the transfer of features from the template to the mold. Another mechanism that can be employed to prevent strong adhesion is functionalization of either or both of the template and mold surfaces with molecules that bind to the surfaces at one end and expose a chemical functional group that chemically repels or otherwise does not adhere the other material due to van der Waals forces or other electromagnetic interactions. For example, in some implementations fluorinating molecules can be added to the surface of a mold to serve as a releasing agent.

Figure 2A:
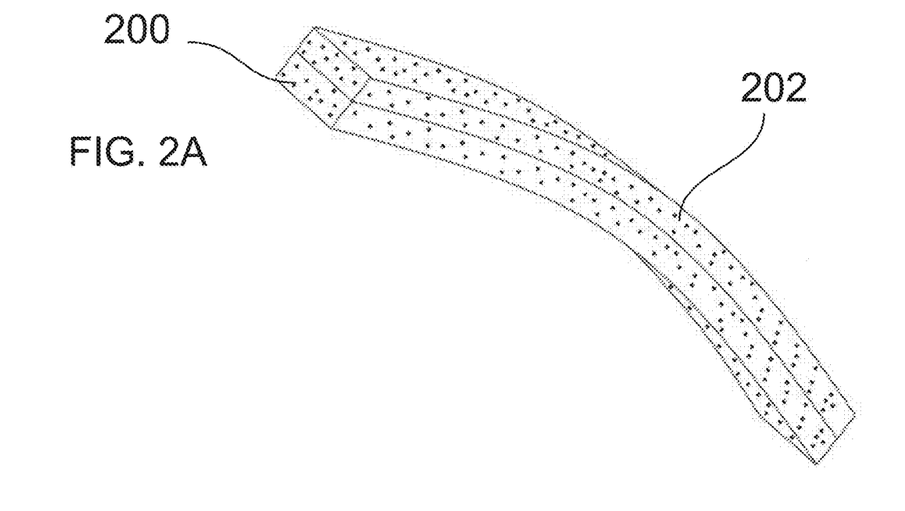
FIG. 2A is a perspective view illustrating another step of an exemplary embodiment of a method of fabrication according the present invention in which a deformable layer is deposited over a substrate.

Turning now to the structure to be monitored, in FIG. 2A a layer of material 202 is shown deposited on the surface of a substrate 200. The substrate 200 is a solid structure that is intended to be monitored for structural health. Structures typically monitored include pipelines, storage tanks, and any other vessels subject to deformation and corrosion over time, but the substrates are not limited to such. Deposited layer 202 can range in phase from liquid to semi-liquid to viscous. In some implementations, the viscosity of the deposited layer 202 and is from 100-5000 cP when it is deposited, but is in any case pliable enough to deform when embossed and to conform to a molded pattern under pressure. More generally, the viscosity of the deposited layer 202 is considered in relation to the hardness of and pressured applied by mold 130. When the deposited layer is a liquid or semi-liquid, a PDMS mold can be used for embossing. When the deposited layer is a solid or has hardened into a solid, then a harder material than PDMS is used for embossing. The relative viscosity/hardness of the mold 130 and deformable layer 202 are also selected based on the ultimate feature size of the photonic structures fabricated. The smaller the features to be fabricated, the greater should be the difference in hardness between the mold 130 and the deformable layer 202. Small features also require a relatively hard (low viscosity) mold 130. In certain implementations, layer 202 comprises a polymeric resin material, which is a liquid under certain controllable temperature/pressure conditions (e.g., 10-40° C.) and capable of being solidified under different controllable conditions. Solidifying techniques that are suitable depending on the material include crystallization, thermosetting, vitrification, solvent evaporation, magnetorheological transitions, mechanically triggered super-cooled liquid crystallization and condensation. Polymeric resins that are particularly suitable for the purposes herein include epoxies, epoxy composites and silicone resins.

Figure 2B:
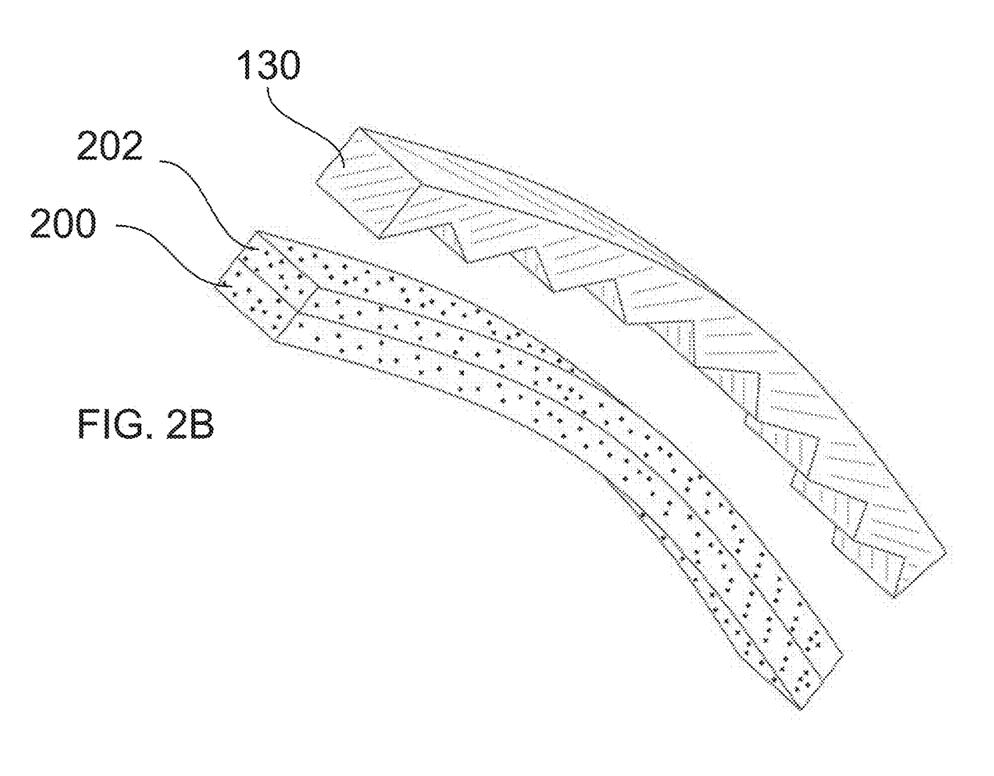
FIG. 2B is a perspective view illustrating a subsequent step of an exemplary embodiment of a method of fabrication according the present invention in which a pattern-bearing mold is brought into contact with a deformable layer on a substrate.

FIG. 2B illustrates the mold 130 positioned over layer 202 so as to commence embossment of a photonic structure pattern onto layer 202. As the mold impresses upon and embosses layer 202, the layer conforms to the various protrusions and recesses presented by the patterned surface of the mold. Depending on the material of the deposited layer 202, the mold 130 can also be heated to render layer 202 more pliable using a technique known as hot embossing. Although it is helpful to minimize the number of transfer procedures in order to minimize problems that can arise during replication, any number of intermediate molds and transfers can be utilized to optimize the compatibility of materials involved in each step.

Figure 2C:
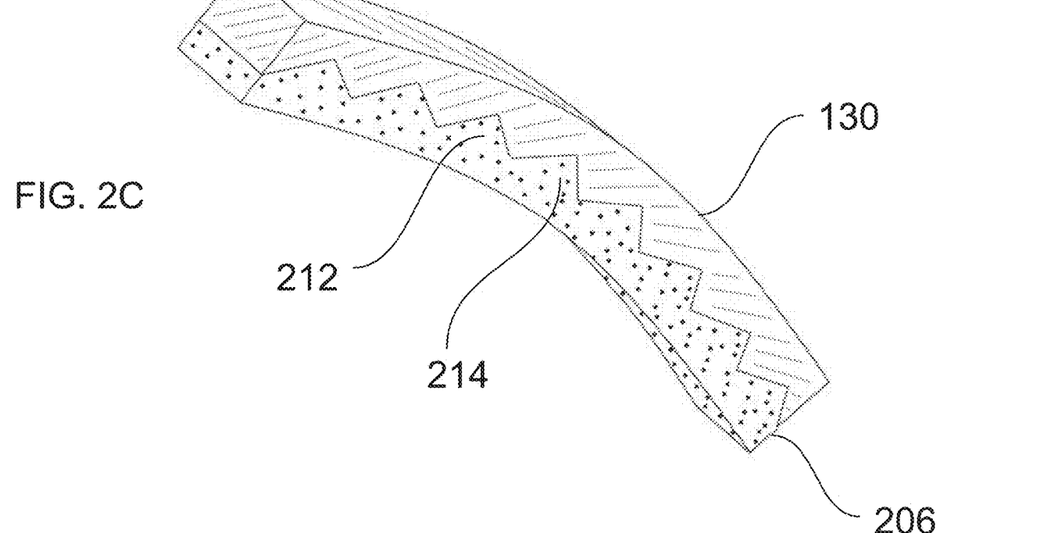
FIG. 2C is a perspective view illustrating a subsequent step of an exemplary embodiment of a method of fabrication according the present invention in which the deformable layer is embossed, branded, etc. by the mold to fabricate the original photonic structure pattern on the template.

In a following step, layer 202 is solidified prior to removal of the mold, which renders permanent the pattern embossed on layer 202. FIG. 2C illustrates an embodiment in which layer 202 is cured and integrated seamlessly with the substrate 200 into a combined embedded structure 206, with discontinuities between the layer and substrate removed. The embedded structure 206 includes a surface pattern with features 212, 214 corresponding to features 112, 114 of template 100.

Figure 3:
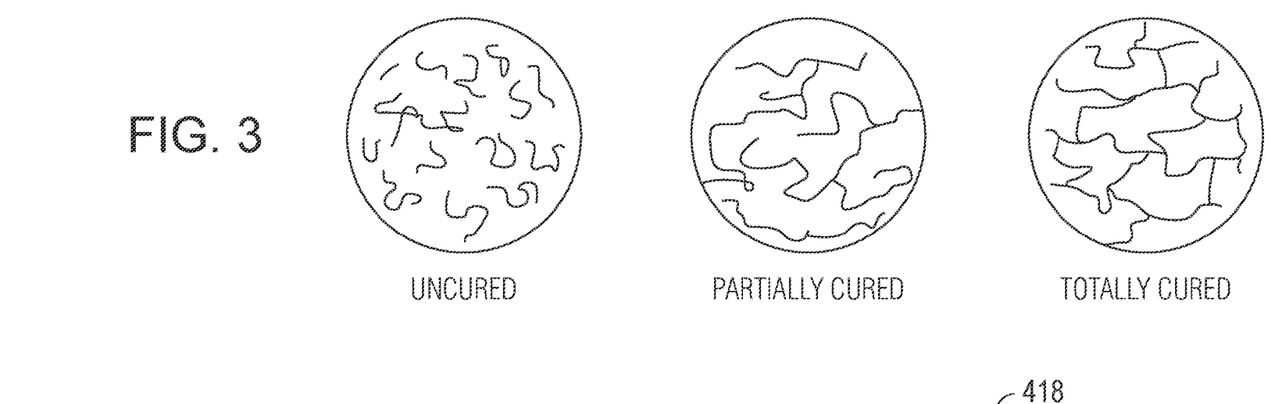
FIG. 3 is a schematic illustration showing three stages of solidification of a polymer resin from a fluid to a partially solidified and finally to a fully solidified state.

The seamless integration between layer 202 and substrate 200 is facilitated when the chemical composition of layer 202 and the substrate surface 200 are the same or are otherwise capable of polymeric cross-linking reactions. More specifically, it is particularly advantageous when the substrate 200 is composed of or includes as a cladding a hardened resinous material, such as an epoxy or epoxy composite, over which a deformable layer of the same material can be deposited. As an example, when a viscous epoxy layer is deposited upon a solid epoxy substrate, the deposited layer can form strong bonds and integrate seamlessly with the underlying substrate upon solidification, which dramatically reduces problems of adhesion between the molded layer 202 and the substrate 200. FIG. 3 is a schematic illustration showing how polymer resins such as epoxy undergo irreversible cross-linking reactions during the solidification process from a fluid to a partially solidified and finally to a fully solidified state. In the solidified state, polymeric molecules form a complex three-dimensional network or matrix. The same chemical mechanism enables bond-formation between molecules of layer 202 and substrate 200 during the curing process, particularly when the compositions of the layer and substrate have similar cross-linking propensities as indicated in the embodiment of FIG. 2C. Thus while in some embodiments it is advantageous to use the same or similar materials for molded layer and the substrate, in other implementations it is not required because adhesion between the molded layer and substrate is sufficient to prevent separation or division of the embedded structure.

Figure 2D:
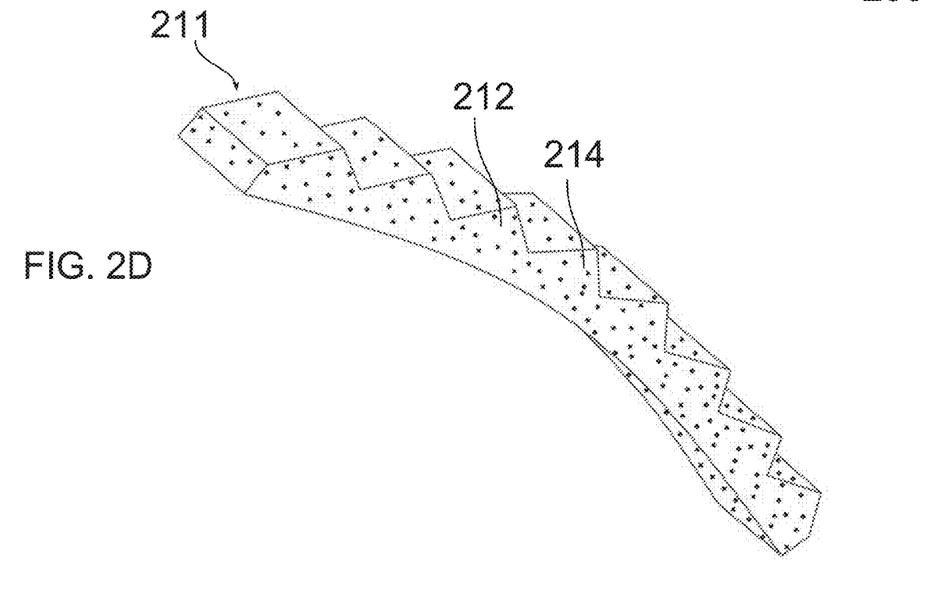
FIG. 2D is a perspective view illustrating a completed fabrication in which the deformable layer has been integrated with the substrate and the mold removed, exposing a photonic structure on the surface of the substrate.

Once the embedded structure 206 has been sufficiently solidified, the mold 130 is removed from the structure. A section of the embedded structure after the mold is removed is shown in FIG. 2D. It is noted that in most implementations, structure 206 will be integrated in a surrounding structure to be monitored and that structure 206 is shown standing alone for illustrative purposes only. As depicted, the surface 211 of structure 206 replicates the original pattern of template 100, with features e.g., 212, 214, forming a diffraction grating.

Figure 2E:
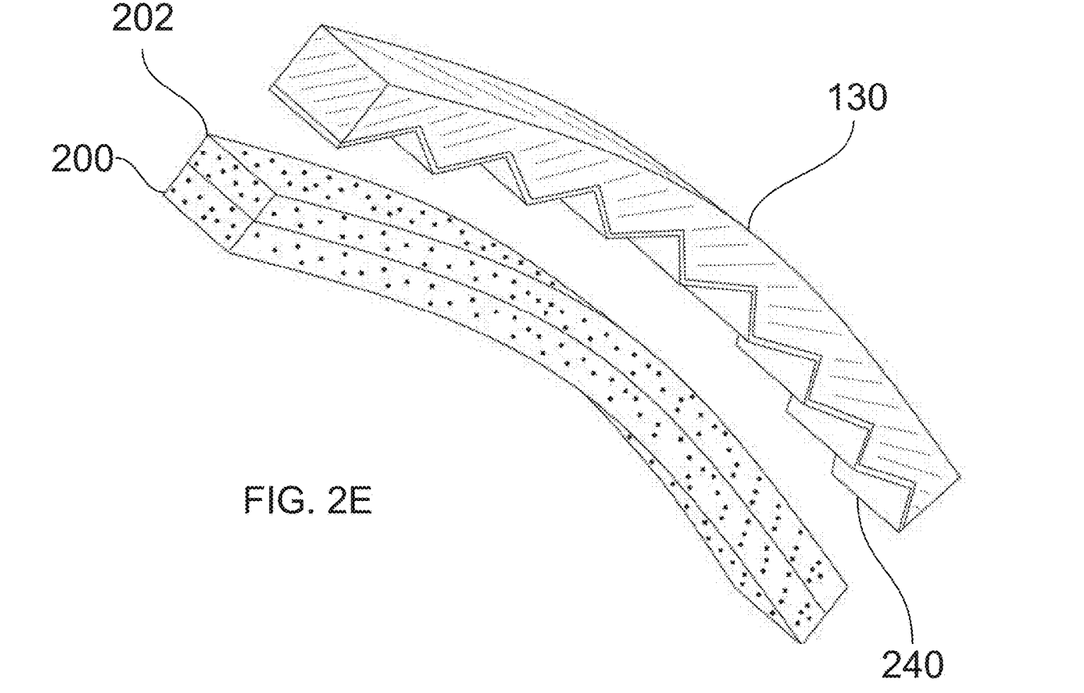
FIG. 2E is a perspective view illustrating an alternative embodiment of a method of fabrication according to the present invention in which the mold includes an anti-adhesion layer for facilitating separation of the mold from the embossed layer.

In some implementations the removal of the mold 130 from structure 206 can be facilitated by adding an additional layer 240 such as a liquid or monolayer, such as trichloro (1H,1H,2H,2H-perfluorooctyl) silane, on mold 130 as shown in FIG. 2E. Additional layer 240 can be applied in a thin film so as to not alter the transfer of features from the template to the mold. Mold 130 can also be functionalized with molecules that bind to the mold 130 and expose a chemical functional group that chemically repels or otherwise does not adhere to the surface of structure 206. While FIG. 2E illustrates the additional layer 240 added to the surface of mold 130, additional layers for facilitating clean separation of the mold 130 and structure 206 can be added to both the mold 130 and the structure 206 simultaneously.

Figure 2F:
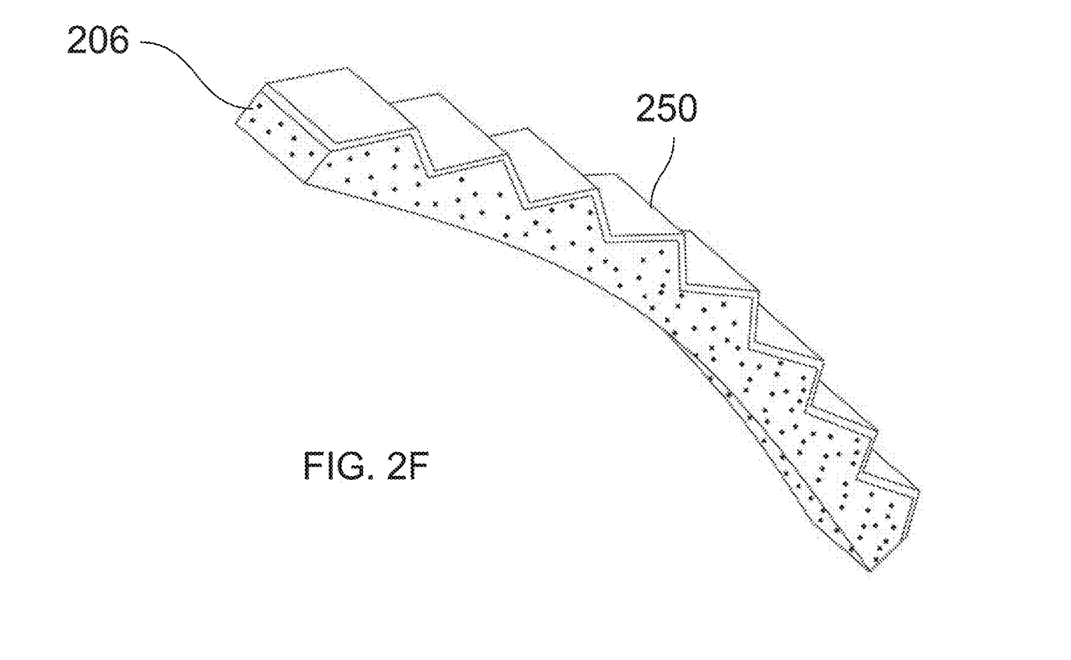
FIG. 2F is a perspective view illustrating an alternative completed fabrication in which the photonic structure includes an added protective and/or functional layer.

In addition, in some implementations, as shown in FIG. 2F, a protective and/or functional layer 250 is added to the surface of the embedded structure 206 to enhance the strength of the structure, or to add specific properties suitable for the application, such as enhanced reflection for photonic coatings. Examples of materials for the protective and/or functional layer 250 include metals, layers, monolayers such as trichloro (1H,1H,2H,2H-perfluorooctyl) silane, ceramics, glass and polymers. Layer 250 can be used instead or in combination with anti-adhesion layer 240, and can be added in the same way, by contact with the mold 130 during the embossing process Alternatively or additionally, layer 250 can be added directly onto a finished surface of structure 206. In some implementations, an aluminum or chromium layer can be added to promote reflection. In some implementations an additional epoxy layer can be added for protection. In particular implementations, both an aluminum or chromium layer and an overlying epoxy layer can be added. Each of these optional steps can comprise a conventional deposition, such as of uniform thickness layers. It is important that any layers added on top of the structure 400 so-formed are transparent to the wavelength(s) of radiation used for inspection of the photonic structures. It is again noted that protective and anti-adhesion layers can be added during any intermediate steps (e.g., in the fabrication of intermediate molds) and to any of the interfaces and surfaces involved in cycles reusing the final material as an initial substrate, as described above.

Figure 4:
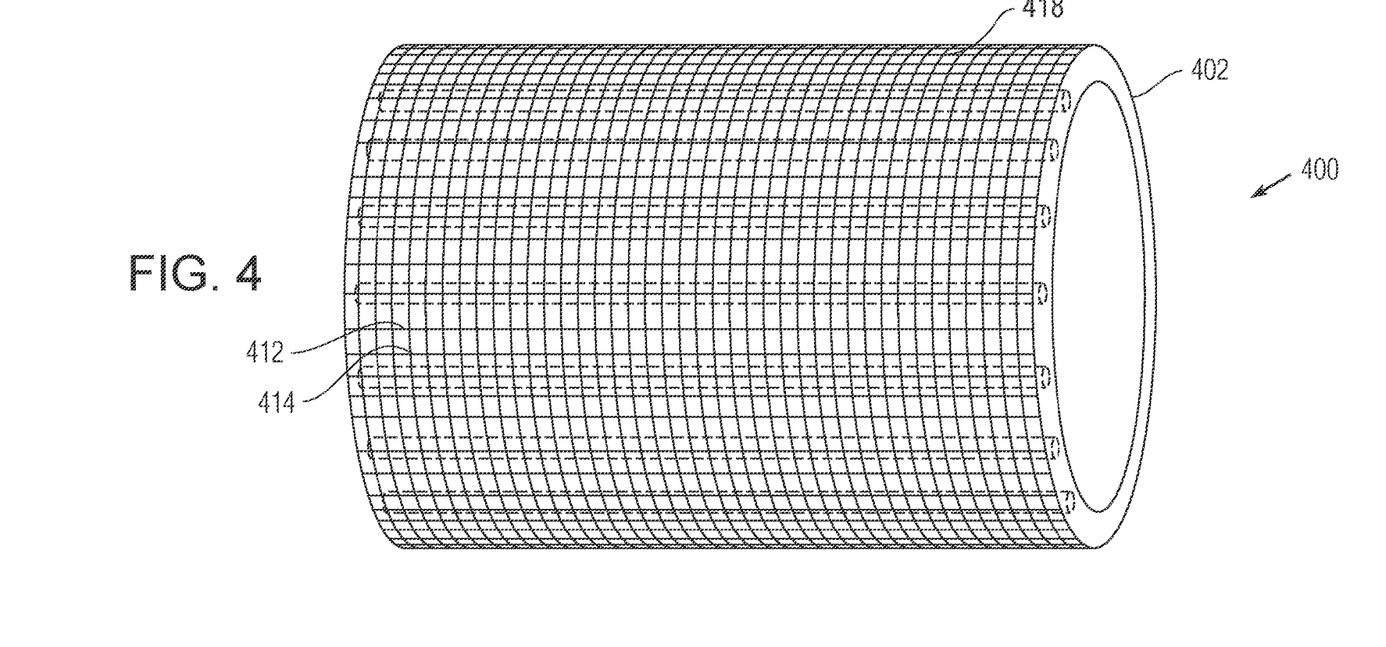
FIG. 4 is a perspective view of a structure including a set of photonic structures fabricated according to an embodiment of a method of the present invention.

A practical application of the disclosed fabrication methods is depicted in FIG. 4, which is a perspective view of a structure 400 having a curved surface 402 on which periodic structures e.g., 412, 414, 418 are defined. In the implementation shown, structures 412, 414 form part of a grating oriented longitudinally along surface 402, while structure 418 forms part of a grating oriented circumferentially, perpendicular to structures 412, 414. It is noted that the relative distance between structures 412, 414, 418 is not representative of practical distances between grating features with respect to an object such as a pipe used, for example, in a pipeline. As mentioned above, the size of the features 412, 414, 418 can be defined in view of the size of the expected perturbations of the structure sought to be monitored.

The disclosed fabrication methods provide several advantageous features. Prominently, the replication of structures that are generally expensive to fabricate can be carried out for little or no cost over large areas with irregular profiles. Furthermore, the fabrication procedures can be repeated indefinitely without wearing down master templates, as the final structures can be used as a template to create a mold in subsequent procedures. This can be particularly advantageous for minimizing mold deformations. In addition, the disclosed fabrication methods are applicable to a wide variety of surfaces, including circular, elliptical, convex, concave and other non-linear surfaces.

Although the disclosed methods were described with reference to structures with diffractive properties presenting features on the order of nanometers to micrometers, the disclosed methods can be extended to replicate structures with features in different size ranges. Therefore, the methods described above can be utilized from indefinitely large scales down to the atomic scale. Conversely, with regard to replication of structures of larger scale, for example, on the order of millimeters, centimeters or above, a greater range of materials can be used for embossing structural patterns, including particulates, gels, suspensions, and the like.

It is to be understood that any structural and functional details disclosed herein are not to be interpreted as limiting the systems and methods, but rather are provided as a representative embodiment and/or arrangement for teaching one skilled in the art one or more ways to implement the methods.

It should be understood that although much of the foregoing description has been directed to systems and methods for implanting photonic materials, methods disclosed herein can be similarly deployed other 'smart' structures in scenarios, situations, and settings beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of fabricating a photonic structure on a surface of a solid substrate including a first material, the method comprising:
   depositing a deformable layer of the first material onto the surface of the solid substrate;
   embossing the deformable layer with a mold bearing a photonic structure pattern and an optically modifying layer;
   solidifying the deformable layer to be integral with the surface of the solid substrate with the mold in place to form permanent photonic structures in the solidified layer; and
   removing the mold from the deformable layer,
   wherein the optically modifying layer of the mold is transferred to the deformable layer upon embossing and is operative to affect optical properties of the photonic structure pattern on the surface of the solid substrate having the solidified deformable layer, and
   wherein the solidifying step comprises one or more of crystallization, solvent evaporation, vitrification, a magnetorheological transition, and condensation.

2. The method of claim 1, wherein the photonic structure includes periodic features arranged along at least one dimension.

3. The method of claim 2, wherein the periodic features form a diffraction grating.

4. The method of claim 2, wherein the periodic features are arranged in two dimensions.

5. The method of claim 1, wherein the deformable layer is deposited in one of a fluid, semi-viscous or viscous form at a time the layer is deposited onto the substrate.

6. The method of claim 5, wherein the first material includes a polymer resin.

7. The method of claim 6, wherein the deformable layer is selected to have a viscosity at atmospheric temperature sufficiently low to be embossed using a PDMS mold.

8. The method of claim 7, wherein the deformable layer has a viscosity ranging from 100 to 5000 cP at the time the resin is deposited on the substrate.

9. The method of claim 1, wherein the mold is composed of polydimethylsiloxane (PDMS).

10. The method of claim 1, wherein the solidified layer forms cross-links with the first material of surface of the substrate.

11. The method of claim 1, further comprising:
    adding an anti-adhesion layer to the mold prior to embossing to prevent adhesion between the mold and at least one of the optically modifying layer and the solidified layer of the first material.

12. The method of claim 11, wherein the anti-adhesion layer comprises a monolayer.

13. The method of claim 1, further comprising:
    adding a layer to the deformable layer prior to embossing to modify properties of the deformable layer upon solidification.

14. The method of claim 13, wherein the added layer comprises a protective coating.

15. The method of claim 13, wherein the added layer modifies optical properties of the photonic structure.

16. A method of fabricating a photonic structure on a surface of a solid substrate, the method comprising:
    depositing a deformable layer onto the surface of the solid substrate;
    embossing the deformable layer with a mold bearing a photonic structure pattern and an optically modifying layer;
    solidifying the deformable layer to be integral with the surface of the solid substrate with the mold in place to form permanent photonic structures in the solidified layer; and
    removing the mold from the deformable layer,
    wherein the optically modifying layer of the mold is transferred to the deformable layer upon embossing and is operative to affect optical properties of the photonic structure pattern on the surface of the solid substrate having the solidified deformable layer, and
    wherein the deformable layer forms cross-linking bonds with the substrate during solidification so as to firmly embed the solidified layer in the substrate, and
    wherein the solidifying step comprises one or more of crystallization, solvent evaporation, vitrification, a magnetorheological transition and condensation.

17. The method of claim 1, wherein the deformable layer and the substrate are made of the same material.

* * * * *